United States Patent
El Khoury et al.

(10) Patent No.: US 10,044,722 B2
(45) Date of Patent: Aug. 7, 2018

(54) BEHAVIORAL MULTI-LEVEL ADAPTIVE AUTHORIZATION MECHANISMS

(71) Applicants: Paul El Khoury, Heidelberg (DE); Oliver Kling, Bruchsal (DE)

(72) Inventors: Paul El Khoury, Heidelberg (DE); Oliver Kling, Bruchsal (DE)

(73) Assignee: SAP SE, Walldorf (DE)

(*) Notice: Subject to any disclaimer, the term of this patent is extended or adjusted under 35 U.S.C. 154(b) by 79 days.

(21) Appl. No.: 14/677,427

(22) Filed: Apr. 2, 2015

(65) Prior Publication Data
US 2016/0294840 A1   Oct. 6, 2016

(51) Int. Cl.
*H04L 29/06*   (2006.01)
*G06F 21/60*   (2013.01)

(52) U.S. Cl.
CPC .......... *H04L 63/102* (2013.01); *G06F 21/604* (2013.01); *G06F 2221/2141* (2013.01)

(58) Field of Classification Search
CPC ... H04L 63/105; H04L 63/205; G06F 21/604; G06F 2221/2141
USPC .......................................................... 726/1
See application file for complete search history.

(56) References Cited

U.S. PATENT DOCUMENTS

| | | | |
|---|---|---|---|
| 6,023,765 A | 2/2000 | Kuhn | |
| 7,343,628 B2 | 3/2008 | Buchholz et al. | |
| 7,689,562 B2 | 3/2010 | Schaad et al. | |
| 7,703,033 B2 | 4/2010 | Buchholz | |
| 7,707,623 B2 | 4/2010 | Cicchitto et al. | |
| 8,635,689 B2 | 1/2014 | Hernandez et al. | |
| 8,813,225 B1* | 8/2014 | Fuller | H04L 63/10 726/23 |
| 2002/0144142 A1 | 10/2002 | Shohat | |
| 2005/0021383 A1 | 1/2005 | Fliess et al. | |
| 2005/0138419 A1 | 6/2005 | Gupta et al. | |
| 2006/0059117 A1* | 3/2006 | Tolson | G06F 21/604 |
| 2008/0141336 A1 | 6/2008 | Haller | |
| 2011/0167479 A1* | 7/2011 | Maes | G06F 21/6281 726/4 |
| 2011/0191485 A1 | 8/2011 | Umbehocker | |
| 2011/0321117 A1* | 12/2011 | Nestler | G06F 21/604 726/1 |
| 2012/0151553 A1* | 6/2012 | Burgess | G06F 21/00 726/1 |
| 2012/0246098 A1 | 9/2012 | Chari et al. | |
| 2014/0109168 A1 | 4/2014 | Ashley et al. | |
| 2014/0122507 A1 | 5/2014 | Zeng et al. | |
| 2014/0196103 A1 | 7/2014 | Chari et al. | |

* cited by examiner

*Primary Examiner* — Daniel Potratz
*Assistant Examiner* — William B Jones
(74) *Attorney, Agent, or Firm* — Fish & Richardson P.C.

(57) ABSTRACT

Implementations of the present disclosure include methods, systems, and computer-readable storage mediums for receiving a support request from a requester, and obtaining a policy for evaluating administrative privileges required for fulfilling the request where the policy is based on a history of actions of the requester. Receiving a system access request for access to digital content, where the system access request is associated with the support request, and providing an access control decision based on the policy.

20 Claims, 5 Drawing Sheets

BEHAVIORAL MULTI-LEVEL ADAPTIVE AUTHORIZATION MECHANISMS

BACKGROUND

Modern enterprise systems (e.g., enterprise resource planning (ERP) systems, customer relationship management (CRM) systems) contain large amounts of privileged and confidential data. Moreover, the level of privileges for different features and data managed by these systems varies widely. In addition, modern enterprise systems are growing in complexity with the integration of mobile, on-demand, and on-site applications becoming more intertwined. Accordingly, the task of ensuring the privileges of different features or data managed by the modern enterprise systems is becoming exceedingly challenging.

SUMMARY

Implementations of the present disclosure include computer-implemented methods for behavioral multi-level authorization of access to applications or data of an enterprise system, the methods being performed by one or more processors. In some implementations, methods include actions of receiving a support request from a requester, and obtaining a policy for evaluating administrative privileges required for fulfilling the request where the policy is based on a history of actions of the requester. Receiving a system access request for access to digital content, where the system access request is associated with the support request, and providing an access control decision based on the policy.

These and other implementations can each optionally include one or more of the following features. Methods can include determining that the system access request requires an access privilege that is absent from the policy, and, in response, transmitting an approval request to grant the access privilege that is absent from the policy and providing the access control decision based on the policy and the approval request. Obtaining the policy for evaluating administrative privileges required for fulfilling the request can include generating the policy based on data mining behavior patterns of the requester from the history of actions by the requester.

The policy can include a set of access privileges based on the behavior patterns of the requester. The set of access privileges can include a minimal set of privileges required to fulfill the support request. The history of actions by the requester can include a log of actions performed by the requester. The policy can include a minimal set of privileges required to fulfill the support request. Methods can include storing the electronic notification as a special log entry Obtaining approval to grant the access privilege that is not supported by the policy can include sending an electronic notification requesting authorization to grant the access privilege to the requester, and receiving authorization to grant the access privilege from the requester. Obtaining approval to grant the access privilege that is not supported by the policy can include sending an electronic notification that the access privilege is required to fulfill the support request and that the access privilege has been granted to the requester.

Obtaining approval to grant the access privilege that is not supported by the policy can include sending an electronic notification requesting authorization to grant the access privilege to a supervisor, and receiving authorization to grant the access privilege from the supervisor. Obtaining approval to grant the access privilege that is not supported by the policy can include sending an electronic notification that the access privilege is required to fulfill the support request and that the access privilege has been granted to a supervisor.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
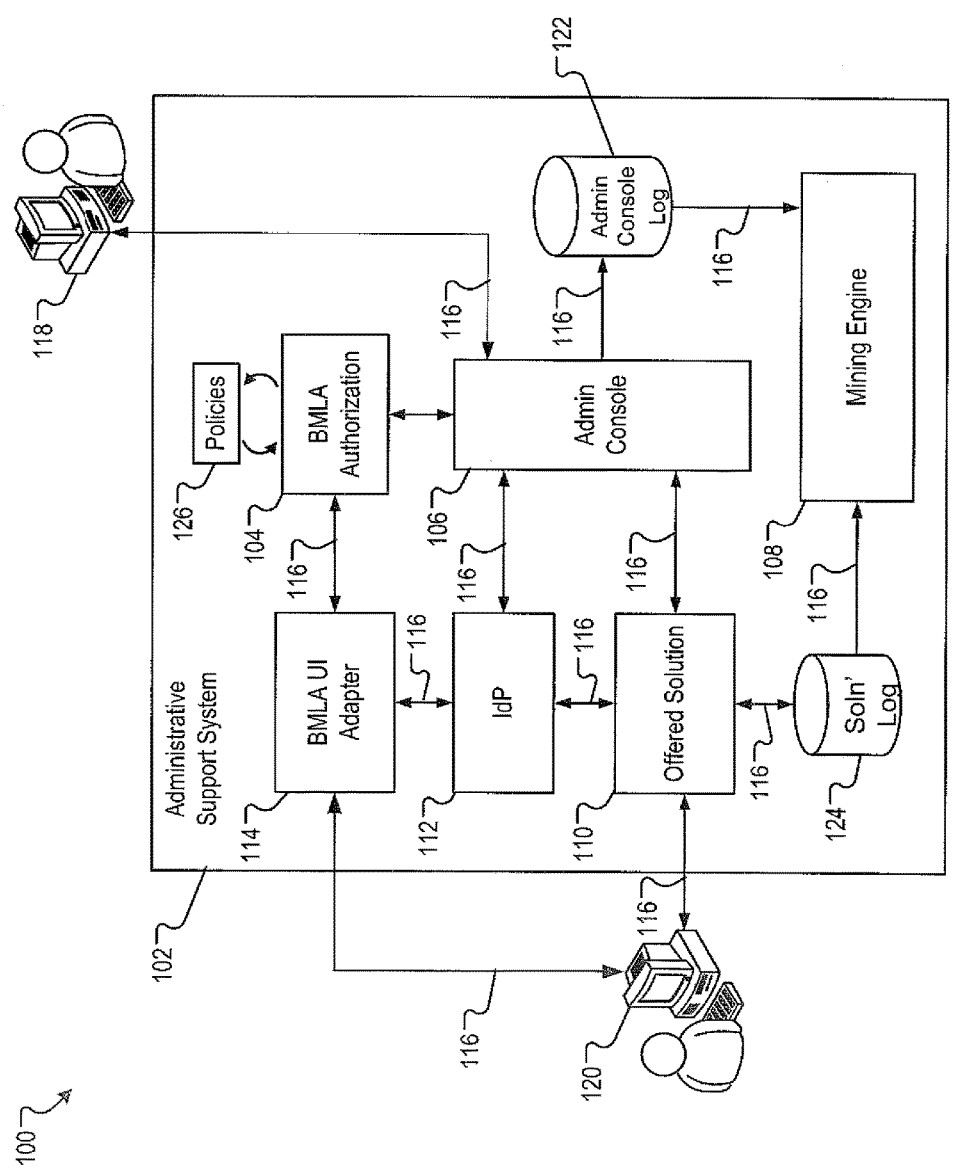
FIG. 1 depicts an example system architecture in accordance with implementations of the present disclosure.

Implementations of the present disclosure are generally directed to securely and efficiently authorizing access requests. In some implementations, an access request is prompted in response to an administrative user requesting access to a resource (e.g., an application, data, or other digital content). In some examples, an administrative user requests access to a resource in response to a support request submitted by a user. In some examples, a set of privileges tailored to fulfilling the support request may be generated by a data mining process. For example, the user's interactions with one or more resources provided by an enterprise system may be stored in data logs at the enterprise system. The data logs can be mined to determine a relevant history of interactions by the user with the one or more resources (e.g., the user's behavior patterns). Hence, in some examples, the administrative user will only be granted privileges in accordance with the requesting user's interaction history.

In some implementations, the administrative user may require additional privileges beyond those determined from the user's behavior patterns. In some examples, approval may be requested to grant the additional privileges from an owner of one or more resources affected by the privilege. For example, approval may be requested from the user who requested administrative support, another user, or one or more supervisors of the administrative user. Accordingly, data security may be improved within an enterprise system by tailoring administrative privileges to the tasks required to be performed to fulfill a support request, and providing minimal or no privileges beyond what is needed. In addition, circumstances requiring additional privileges may be efficiently approved on a case-by-case basis by the appropriate authority.

Traditional administration authorization methods can rely on roles granting access privileges to individual administrative users. The roles are generally static, and provide individual administrative users with a maximum level of privileges that the administrative user may need to complete a wide variety of assigned tasks. Generally, administrative users, especially those with supervisory roles and high levels of privilege, have more privileges than required for the majority of their tasks. This presents the potential for data security breaches. Supervisors and clients must trust the administrative users with the security of their data, generally, relying on contracts between data owners and system operators.

In contrast, implementations of the present disclosure provide methods and systems to restrict access privileges for administrative users to those needed for particular tasks, while at the same time providing the ability to grant additional privileges on a case-by-case basis. In some examples, approval of additional privileges may be granted by an owner of a privileged resource or another administrative user (e.g., a supervisor). In some examples, the additional privileges may be granted without express prior approval by another user, but an electronic notification of the granted privilege may be sent to an owner of a resource or a supervisor, for example. Consequently, implementations of the present disclosure may provide the advantages of increased data security in enterprise or other systems, while at the same time maintaining flexibility to promptly address unique situations on a case-by-case basis.

FIG. 1 depicts an example system architecture 100 in accordance with implementations of the present disclosure. The example system architecture 100 includes an example network administrative support environment. It is contemplated, however, that implementations of the present disclosure can be applicable in any appropriate type of environment (e.g., cloud-based environments and other complex systems or environments).

FIG. 1 depicts a generic network administration architecture for evaluating network access permissions. In the example of FIG. 1, the example system architecture 100 includes, an administrative support system 102 made up of a Behavioral Multi-Level Adaptive (BMLA) authorization component 104, an admin console component 106, a data mining engine 108, an offered solutions component 110, an Identity Provider (IdP) component 112, optionally, a BMLA user interface (UI) adapter 114, and one or more communication channels 116. In some examples, the Behavioral Multi-Level Adaptive (BMLA) authorization component 104, administrator (admin) console component 106, data mining engine 108, offered solutions component 110, IdP component 112, and BMLA user interface (UI) adapter 114 can communicate with one another through the one or more communication channels 116. An example communications channel 116 includes a network (e.g., a large computer network, such as a local area network (LAN), a wide area network (WAN), the Internet, a cellular network, or a combination thereof).

In addition, one or more client devices (e.g., admin user client device 118 and business user client device 120) may interface with the administrative support system 102. The client devices 118, 120 may include any appropriate client computing device such as (e.g., desktop computers, laptop computers, tablet computers, smartphones, electronic kiosks, etc). In addition, the client devices 118, 120 may communicate with the administrative support system 102 through the one or more communication channels 116. In some examples, the administrative user may use client device 118 to interface with the admin console component 106. In some examples, a business user may use client device 120 to interface with the offered solution component 110 and the BMLA UI adapter 114.

In some implementations, the administrative support system 102 and each of its components can be provided by one or more server systems. In the depicted example, the BMLA authorization component 104, admin console component 106, data mining engine 108, offered solutions component 110, IdP component 112, and BMLA UI adapter 114 can each be provided as one or more software modules executed by one or more server systems. In some examples, the administrative support system 102 includes an admin console log 122 that logs some or all of the actions performed by administrative users, and a solution log 124 that logs some or all the interactions between business users and solutions or products offered by the offered solution component 110.

The administrative support system 102 may provide various solutions to users. For example, the administrative support system 102 may be an enterprise system (e.g., a banking system, a retail customer support system, or an information technology (IT) support system). In some examples, users may interface with the offered solution component 110 to interact with various products or customer solutions offered by a business, for example, through the administrative support system 102 (e.g., websites, applications, data storage, or other appropriate digital content). In some examples, administrative users may interface with the admin console component 106 to perform system administrative tasks (e.g., assigning disk space, creating new user identities, and managing user access to offered solutions). The operation of the BMLA authorization component 104, the data mining engine 108, and the BMLA UI adapter 114 is described in further detail herein.

Implementations of the present disclosure will be described in further detail with reference to an example use case. The example use case include an enterprise system, e.g., a banking system, providing business functionality, and enforcing one or more administrator access control policies (e.g., policies 126). It is contemplated, however, that implementations of the present disclosure can be realized in any appropriate use case.

In a banking system use case, for example, a customer service representative (CSR) may be assigned a task of verifying transactions on a customer's account. The customer may own multiple accounts at the bank (e.g., a checking account, a savings account, and a certificate of deposit account). The customer may interact through the bank's online banking system (e.g., through offered solution component 110) with the checking account and savings account frequently, but may interact infrequently with the certificate of deposit account. Furthermore, the customer's interactions with his accounts may be logged (e.g., in solution log 124). While reviewing his accounts, the customer may notice an inconsistency requiring a compensating transaction between the checking account and the savings account. The customer may request support from a CSR at a bank to correct the inconsistency.

While bank representatives may generally be authorized to access all accounts owned by a customer, in the above-described example, there is no reason for the CSR to access the customer's certificate of deposit account. Thus, when the administrative support system 102 receives the customer's support request, the data mining engine 108 extracts logs of the customer's interactions with the offered solution component 110, and establishes the customer's behavior patterns as related to their accounts. The data mining engine 108 determines one or more privileges required to fulfill the customer's support request. These privileges are sent to the BMLA authorization component 104, where they are stored as practical privileges for the customer's support request with the admin policies 126. For example, based on the customer's recent interaction with the checking and savings accounts, the practical privileges may support administrative access to those accounts, but not to the certificate of deposit account.

When a CSR (e.g., an administrative user) requests or attempts access to the customer's account data, the BMLA authorization component 104 determines whether the CSR's access request or attempt is supported by the practical privileges determined by the data mining engine 108. For example, if the CSR is attempting to access the customer's checking or savings account, the practical privileges would support such an action. However, the practical privileges would not support an attempt to or request to access the customer's certificate of deposit account. If on the other hand, the CSR requested or attempted access to the customers certificate of deposit account, the BMLA authorization component 104 would not provide the CSR with the appropriate access in this example.

In some implementations, if the CSR requested or attempted access to the customer's certificate of deposit account, the BMLA authorization component 104 may require explicit approval from the customer. In such an implementation, the BMLA authorization component 104 may communicate with the BMLA UI adapter 114 and cause the BMLA UI adapter 114 to send an access authorization request to the customer. The access authorization request may both inform the customer that the CSR is requesting access data related to the customer's certificate of deposit account, and request confirmation from the customer grating or denying such access. In this manner, the administrative support system 102 may tailor access controls to those needed for a specific request based on the user's prior history of interactions. In so doing, the administrative support system 102 may provide an increased level of privacy and data security for business users, while, at the same time, efficiently managing system resources to provide required access to administrative users.

Figure 2:
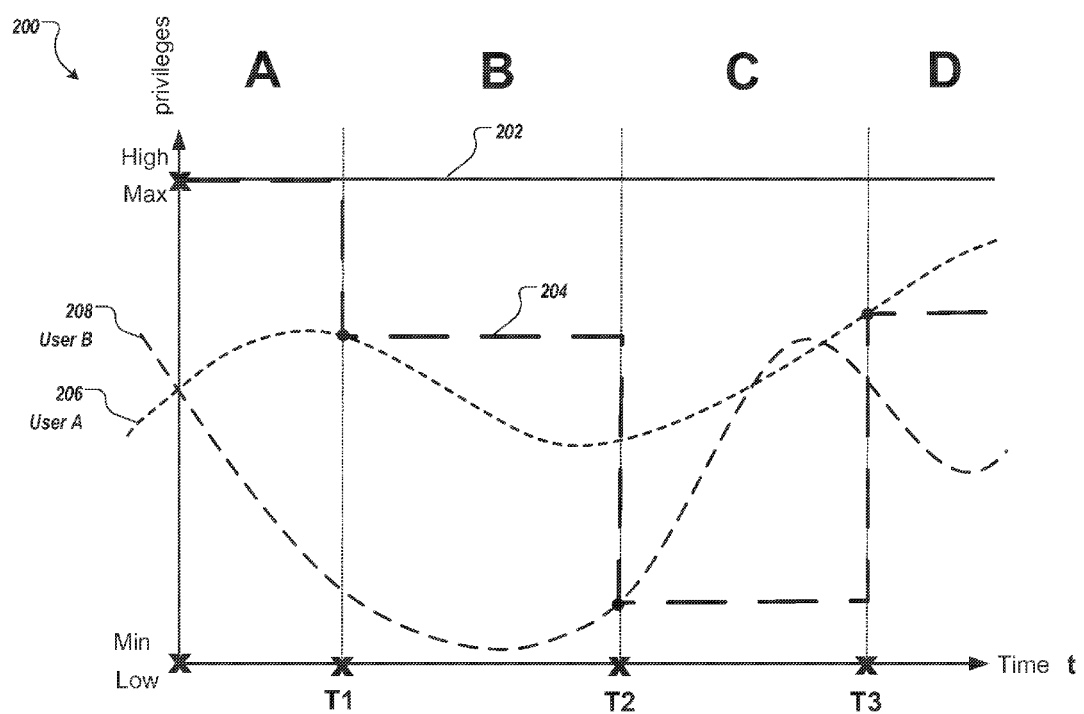
FIG. 2 depicts a graphical illustration of an example process in accordance with implementations of the present disclosure.

FIG. 2 depicts a graphical illustration 200 of an example process in accordance with implementations of the present disclosure. The graph 200 illustrates the process described above. The x-axis represents time, and the y-axis represents increasing system privileges. Lines 202, 204 represent the system access privileges for a particular representative (e.g., the CSR). Line 202 represents the maximum privileges authorized for the administrative user, for example, a maximum level of privileges authorized to an administrative user or group of administrative users based on their role in an organization. Line 204 represents a practical level of system privileges provided to the administrative user in order to fulfill a specific request from a business user. The practical level of system privileges may be some subset of the administrative user's maximum privileges, and, as described above, is tailored based on the requesting user's behavior pattern as indicated by a history of interaction with the system. Lines 206, 208 represent levels of interaction with the system by two users, user A and user B, respectively.

In the example of FIG. 2, user A requests assistance from the administrative user at time T1. The system assesses user A's recent interaction with the system, for example, by performing data mining on logs of user A's interaction with the system over a recent period of time. User A's recent interaction is represented in graph 200 by line 206 to the left of time T1. The system then establishes a practical level of privileges for the administrative user (e.g., as represented by the step down of line 204 in the region B) based on the assessment of user A's behavior pattern. As the administrative user fulfills user A's support request, the administrative user's system access privileges will be limited to those represented by line 204 in region B. The administrative user will be granted access to any system resources (e.g., applications, data, or other digital content) that meets the practical level of privileges determined for the task.

User B requests assistance from the administrative user at time T2. As in the case of user A's request, the system assesses user B's recent interaction with the system as represented by line 208 to the left of time T2. In accordance with user B's recent behavior patterns, as indicated by a history of interaction with the system, a practical level of privileges is determined for the administrative user for fulfilling user B's support request (e.g., as represented by the step down of line 204 in the region C). Again, the administrative user's access privileges to the system for fulfilling user B's support request will be limited to those defined by the practical level of privileges. If however, user B's support request requires elevated privileges, the system may require verification or approval from user B prior to granting the additional privileges to the administrative user. For example, perhaps user B is preparing to perform more substantive interactions with the system, as indicated by the rise in line 208 in region C. In such an example, the system may initially block the administrative user's attempt to access portions of the system not permitted by the practical privileges, and send an electronic approval request to the user B. The approval request may be an electronic message(e.g., an e-mail, SMS message, chat message, voicemail, or other appropriate type of electronic message). In addition, the approval request may provide user B with a method for approving or denying the additional privileges requested by the administrative user. When the system receives user B's grantor denial of the privilege the system will accordingly grant or deny the administrative user requested privilege.

In some implementations, the approval request may be sent to a supervisor of the administrative user who is requesting additional privileges. In some implementations, the administrative user may be granted access to the additional privileges without requiring additional approval, in such implementations, for example, a notification or alert may be sent to the user (e.g., user B), another user, and/or a supervisor of the administrative user. The notification may indicate the additional privileges granted to the administrative user and the reason for granting the privileges.

In some implementations, the practical privileges are defined in a the approval request or notification may be stored in a special log file (e.g., an administrative log or archive log). In some implementations, a notification may be sent in lieu of and approval request when the additional privileges below a threshold privilege level. In some examples, the threshold privilege level may be determined relative to the privileges granted as practical privileges.

In some implementations, the practical privileges for one or more administrative users is dynamic, and can, for example, change based on time, tasks, or identity of a user being assisted. For example, after a task associated with a particular set of practical privileges is completed, the administrative user's practical privileges are returned to a default level of practical privileges. The default level of practical privileges may be, for example, a level of privileges less than the maximum privileges authorized to the individual administrative user. In some implementations, the default level of practical privileges may be no privileges or only those privileges granted to a non-administrative users, thereby, limiting an administrative users administrative access to only those times when he or she has administrative tasks to perform.

Figure 3:
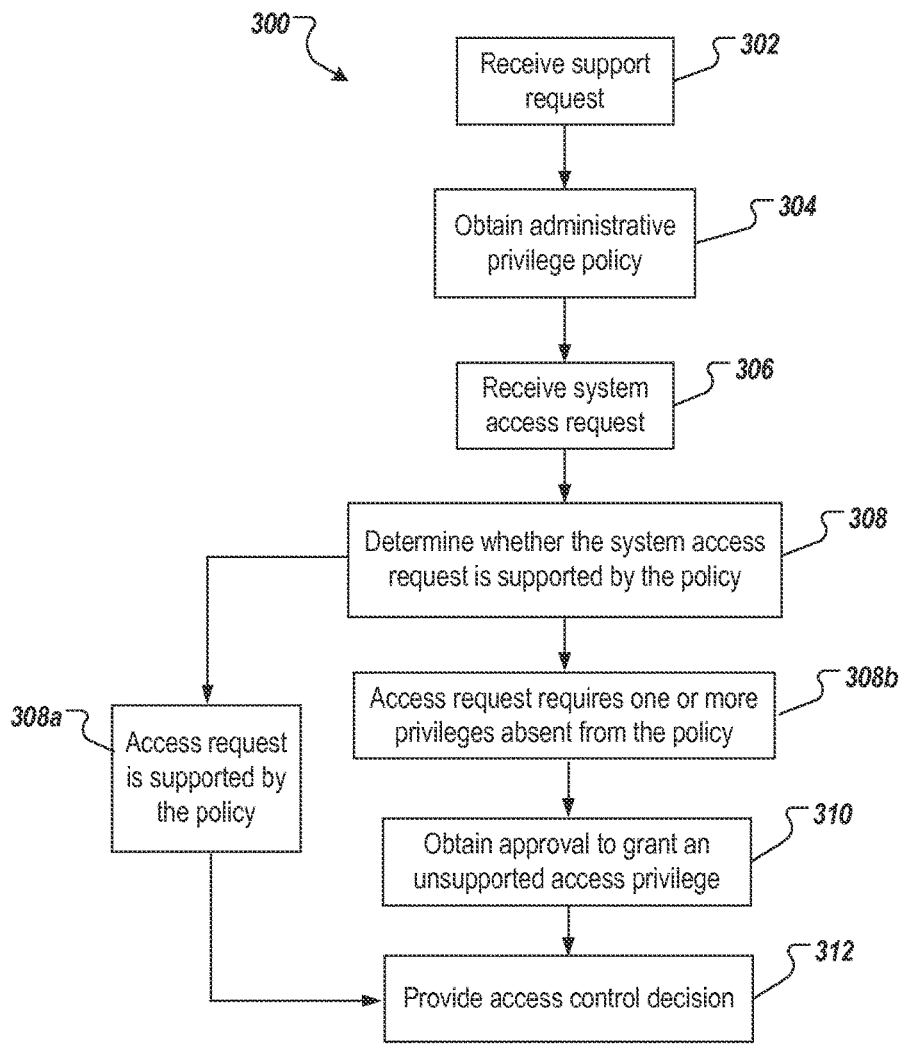
FIG. 3 depicts an example process that can be executed in accordance with implementations of the present disclosure.
Figure 4:
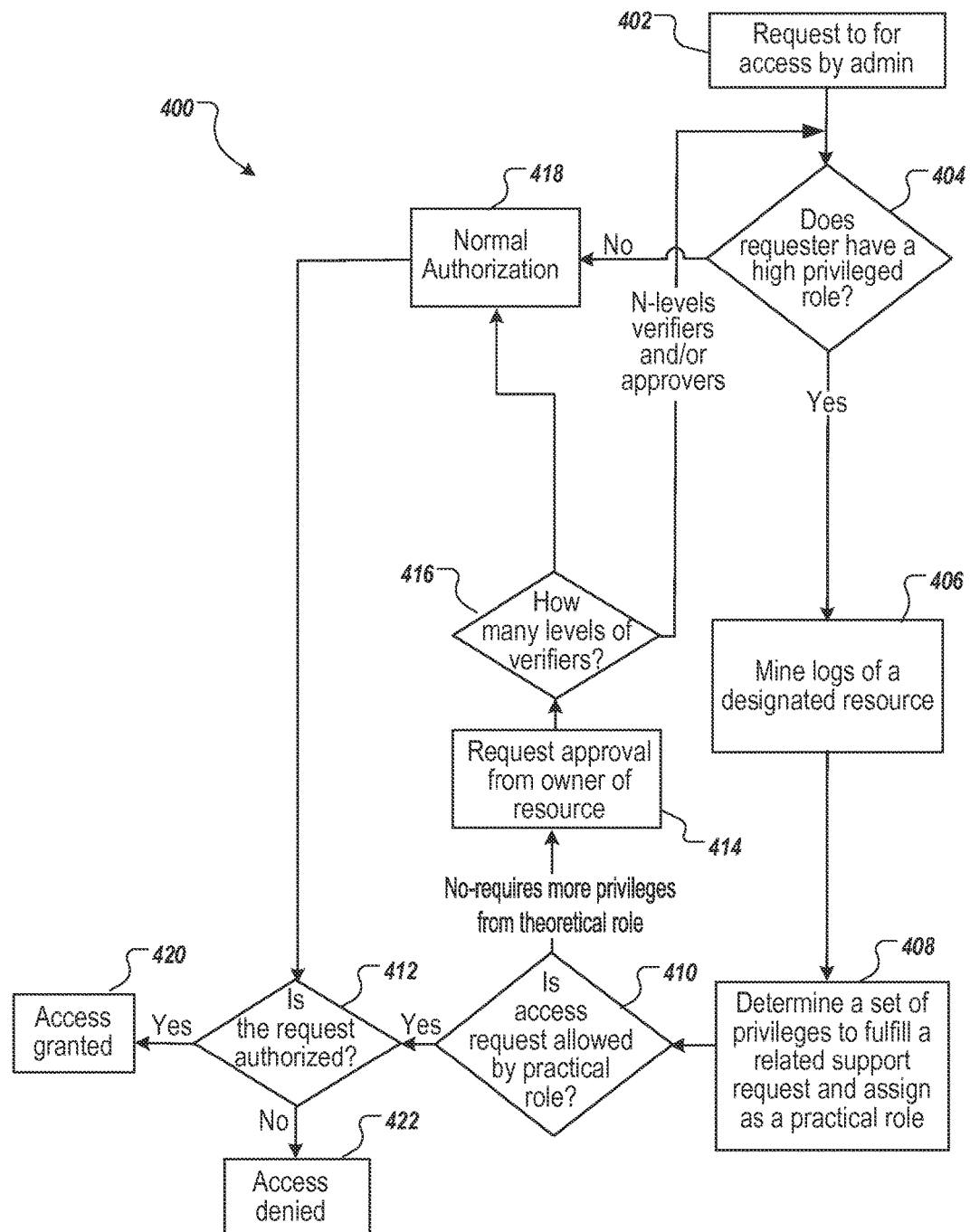
FIG. 4 depicts another example process that can be executed in accordance with implementations of the present disclosure.

FIGS. 3 and 4 respectively depict example processes that can be executed in accordance with implementations of the present disclosure. In some implementations, the example processes can be realized using one or more computer-executable programs (e.g., a browser, a web application, a mobile application, a server-hosted application) executed using one or more computing devices (e.g., a client-side computing device, a server-side computing device).

With particular reference to FIG. 3, a support request is received (302). In some examples, the support request is received by an administrative support system from a user. The support request may include a request for an administrative user to perform some administrative action on behalf of the user. An administrative privilege policy is obtained (304). In some examples, the administrative privilege policy is based on a history of actions performed by the requester. In some examples, one or more logs of interactions by the requester with one or more solutions or products offered by the system can be mined using data mining techniques. In some examples, the administrative privilege policy can represent a subset system access privileges from a theoretical system access privilege policy for a particular administrative user or a group of administrative users. The administrative privilege policy may represent a practical privilege policy (PPP) that includes the minimum privileges needed for fulfilling the support request (e.g., a set of practical privileges as discussed above in reference to FIG. 2).

A system access request is received (306). For example, an administrative user who has been assigned to fulfill the requester's support request may request or attempt access to privilege system functions or data. A determination that the system access request requires a privilege that is not supported by the policy is made (308). For example, in response to receiving the system access request, the privileges required for the access request may be compared to the administrative privilege policy, e.g., the PPP. In some examples, if the privileges required by the access request are permitted by the PPP access to the requested system functions or data may be immediately granted. If, however, the privileges required by the access request are not permitted by the PPP, approval to grant the unsupported access privilege is obtained (310). In some examples, electronic approval request for notification may be sent to an owner of the system function or data. For example the electronic approval request or notification may be sent to the support requester or one or more supervisors of the administrative user seeking the access. An access control decision is provided (312). Access to the requested system functions or data is either granted or denied based on a response to the approval request for notification. In some examples, the response to the approval request for notification may be stored, for example, in an archive log for later access.

In some implementations, a profile is generated for the requester based on the data obtained from mining the one or more logs of interactions by the requester with one or more solutions or products offered by the system, and the PPP is generated based on the profile. The profile can be generated each time a particular requester seeks administrative support (e.g., by submitting an support request). In some examples, the profile is generated for a particular requester the first time that the requester requests administrative support, and is subsequently stored. In such examples, the stored profile can be updated (e.g., periodically or upon receiving a subsequent support request from the requester).

For example, referring to the example banking system use case described above, the banking customer may experience another problem with one of their bank accounts and request customer support through the baking system a second time. A profile that was generated for the customer in response to the first support request and stored can be used to generate a set of practical privileges (e.g., a PPP) for a CSR to fulfill the new support request. In some implementations, if a threshold period of time has lapsed since the customer's first support request, the customer's profile may be updated based on data mining logs of the customer's interactions with the banking system since the first request.

With particular reference to FIG. 4, the request for access to system applications or data is received from an administrative user (402). The system determines whether the requesting administrative user as a high privileged administrative role (404). For example, if the requested access relates to non-privileged system applications or data, the request will be processed through a traditional authorization procedure (418). For example, the request can be approved by verifying against an Access Control List (ACL) that the administrative user has proper authority to fulfill the request. An example ACL is a list containing static information regarding authorized privileges for one or more administrative users. Generally, the ACL defines the highest privileges that may be required by each administrative user based on their individual role, and is changed when a particular administrator's role changes. On the other hand, if, for example, the requested access relates to privilege system applications or data, the process proceeds to step (406) in which logs of a designated resource are mined. For example, as described above, data logs of resources with which a business user requesting administrative support had interacted may be mined to determine privileges required to fulfill the business user's support request. A set of privileges needed to fulfill the business user support request related to the system access request are determined based on the mind data and assigned as a practical level for the administrative user (408). The access request is then compared to the privileges of practical role for the administrative user to determine whether the access request is permitted by the practical role (410). For example, if all of the privileges required by the access request are permitted by the practical role in the access request is allowed by the practical. In some examples, it is then verify that the access request is authorized for the requesting administrative user (412). If the request is authorized, the requested access is granted (420), otherwise, the access is denied (422).

In some examples, the requested access may not be allowed by the practical role. For example, one or more privileges required to grant the access request may not be included in the practical role as determined from mining the designated resource. Thus, permission to grant the additional privilege or privileges must be obtained prior to granting the access request. Approval to grant the additional privilege or privileges is requested from one or more owners of the resource (414). The owner of the resource may be, for example, the user requesting administrative support, and other user, and/or one or more supervisors of the administrative user. In some examples, an electronic approval request message may be sent to the owner(s) of the resource requesting approval to grant the needed privilege of privileges. If, for example, an additional required privilege itself requires multiple levels of verification (416) the process returns to step (404), and may be repeated until all required approvals have been obtained. Once all required approvals have been either obtained or denied the process proceeds through normal authorization procedures (418). If approval has been obtained for all the required privileges the access request is granted (or 20). Otherwise, if approval has not been obtained for all of the required privileges the access request is denied (422).

Figure 5:
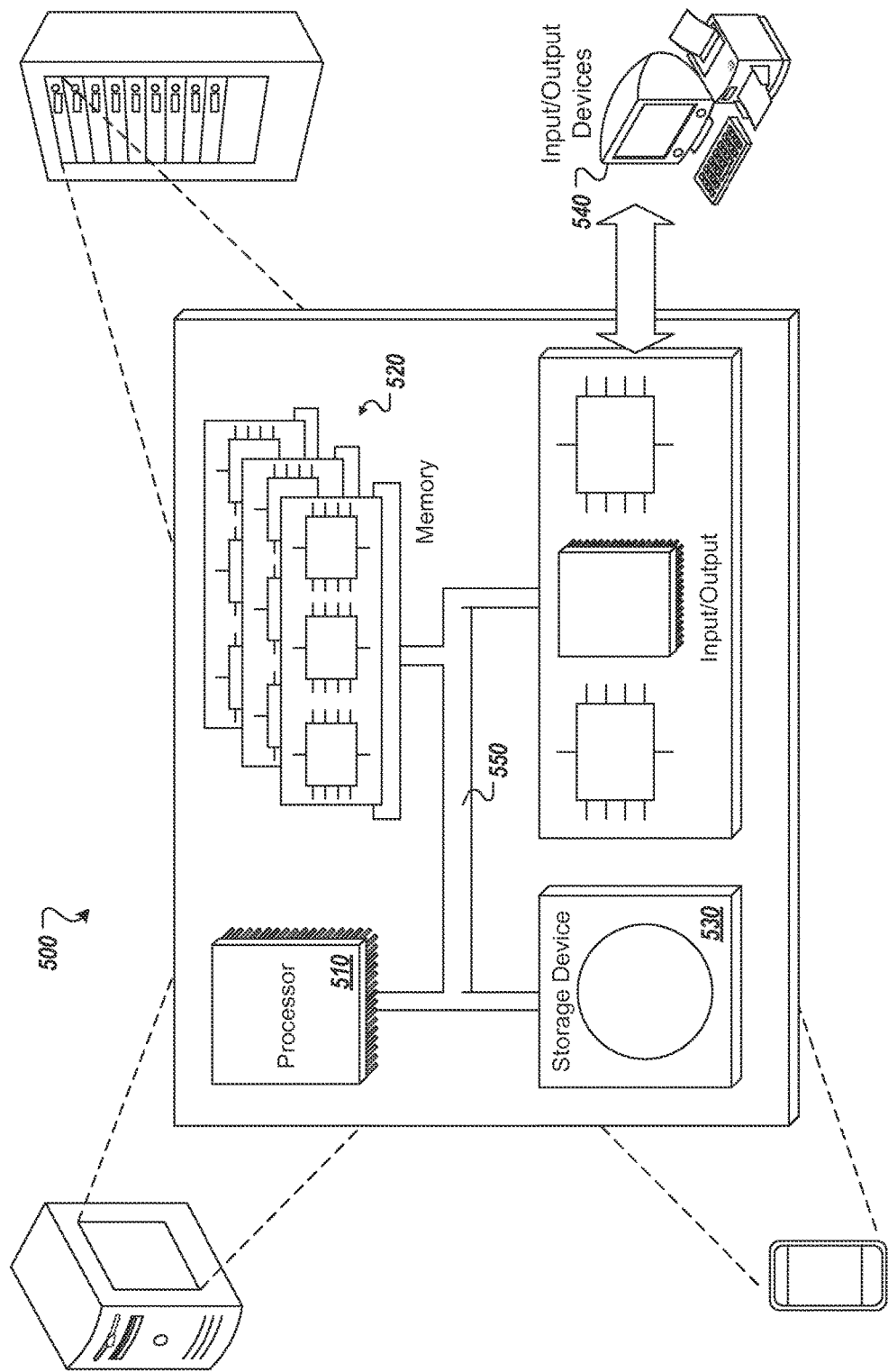
FIG. 5 depicts a schematic diagram of an example computing system.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more hardware processors, the method comprising:
   receiving, by the one or more hardware processors, a support request from a requester, the support request defining a task to be performed by an administrative user;
   obtaining, by the one or more hardware processors, a policy for evaluating administrative privileges required for fulfilling the task, the policy being based on a history of actions of the requester and comprising a set of access privileges for the administrative user that are relevant for the task, the set of access privileges dynamically changing over time based on the task and an identity of the requester by limiting an access of the administrative user to a time period that is determined based on the task to be performed, such that after the task is completed, the set of access privileges of the administrative user are returned to a default privilege level that is less than a maximum privilege level authorized for the administrative user;
   receiving, by the one or more hardware processors, a system access request for access to digital content by the administrative user, the system access request being associated with the support request; and
   providing, by the one or more hardware processors to a graphical user interface for display, an access control decision based on the policy and the task.

2. The method of claim 1 comprising:
   determining that the system access request requires an access privilege that is absent from the policy, and in response:
      transmitting an approval request to grant the access privilege that is absent from the policy, and
      providing the access control decision based on the policy and the approval request.

3. The method of claim 1, wherein obtaining the policy for evaluating administrative privileges required for fulfilling the task comprises generating the policy based on data mining behavior patterns of the requester from the history of actions by the requester.

4. The method of claim 3, wherein the policy comprises a set of access privileges based on the behavior patterns of the requester.

5. The method of claim 4, wherein the set of access privileges comprises a minimal set of privileges required to fulfill the support request.

6. The method of claim 1, wherein the history of actions by the requester includes a log of actions performed by the requester.

7. The method of claim 1, wherein obtaining approval to grant the access privilege that is not supported by the policy comprises:
   sending, to the requester, an electronic notification requesting authorization to grant the access privilege to the administrative user; and
   receiving, from the requester, an authorization granting the access privilege to the administrative user.

8. The method of claim 1, wherein obtaining approval to grant the access privilege that is not supported by the policy comprises sending, to the requester, an electronic notification that the access privilege is required to fulfill the support request and that the access privilege has been granted.

9. The method of claim 1, wherein obtaining approval to grant the access privilege that is not supported by the policy comprises:
   sending, to a supervisor, an electronic notification requesting authorization to grant the access privilege; and
   receiving, from the supervisor, authorization to grant the access privilege.

10. The method of claim 1, wherein obtaining approval to grant the access privilege that is not supported by the policy comprises sending, to a supervisor, an electronic notification that the access privilege is required to fulfill the support request and that the access privilege has been granted.

11. The method of claim 10 comprising storing the electronic notification as a special log entry.

12. The method of claim 1, wherein the policy comprises a minimal set of privileges required to fulfill the support request.

13. A system comprising:
    one or more hardware processors; and
    a data store coupled to the one or more hardware processors having instructions stored thereon which, when executed by the one or more hardware processors, causes the one or more hardware processors to perform operations comprising:
    receiving a support request from a requester, the support request defining a task to be performed by an administrative user;
    obtaining a policy for evaluating administrative privileges required for fulfilling the task, the policy being based on a history of actions of the requester and comprising a set of access privileges for the administrative user that are relevant for the task, the set of access privileges dynamically changing over time based on the task and an identity of the requester by limiting an access of the administrative user to a time period that is determined based on the task to be performed, such that after the task is completed, the set of access privileges of the administrative user are returned to a default privilege level that is less than a maximum privilege level authorized for the administrative user;
    receiving a system access request for access to digital content by the administrative user, the system access request being associated with the support request; and
    providing to a graphical user interface for display, an access control decision based on the policy and the task.

14. The method of claim 13 comprising:
    determining that the system access request requires an access privilege that is absent from the policy, and in response:
       transmitting an approval request to grant the access privilege that is absent from the policy, and
       providing the access control decision based on the policy and the approval request.

15. The method of claim 13, wherein obtaining the policy for evaluating administrative privileges required for fulfilling the task comprises generating the policy based on data mining behavior patterns of the requester from the history of actions by the requester.

16. The method of claim 15, wherein the policy comprises a set of access privileges based on the behavior patterns of the requester.

17. A non-transient computer readable medium storing instructions that, when executed by one or more hardware processors, cause the one or more hardware processors to perform operations comprising:
- receiving a support request from a requester, the support request defining a task to be performed by an administrative user;
- obtaining a policy for evaluating administrative privileges required for fulfilling the task, the policy being based on a history of actions of the requester and comprising a set of access privileges for the administrative user that are relevant for the task, the set of access privileges dynamically changing over time based on the task and an identity of the requester by limiting an access of the administrative user to a time period that is determined based on the task to be performed, such that after the task is completed, the set of access privileges of the administrative user are returned to a default privilege level that is less than a maximum privilege level authorized for the administrative user;
- receiving a system access request for access to digital content by the administrative user, the system access request being associated with the support request; and
- providing to a graphical user interface for display, an access control decision based on the policy and the task.

18. The method of claim 17 comprising:
- determining that the system access request requires an access privilege that is absent from the policy, and in response:
  - transmitting an approval request to grant the access privilege that is absent from the policy, and
  - providing the access control decision based on the policy and the approval request.

19. The method of claim 17, wherein obtaining the policy for evaluating administrative privileges required for fulfilling the task comprises generating the policy based on data mining behavior patterns of the requester from the history of actions by the requester.

20. The method of claim 19, wherein the policy comprises a set of access privileges based on the behavior patterns of the requester.

\* \* \* \* \*